INVENTOR.
BRUCE E. BRILEY
BY
C. A. Gulbrandsen
ATTY.

United States Patent Office 3,312,839

Patented Apr. 4, 1967

3,312,839

DELAY ARRANGEMENT USING TRANSISTOR WITH MINORITY CARRIER STORAGE

Bruce E. Briley, La Grange Park, Ill., assignor to Automatic Electric Laboratories, Inc., Northlake, Ill., a corporation of Delaware Filed May 7, 1964, Ser. No. 365,766
2 Claims. (Cl. 307—88.5)

This invention relates to transistor delay circuits.

The conventional delay circuit depends upon a resistor and capacitor time constant for its delay period. The multivibrator is an example of such a delay circuit.

When a long delay is desired, discrimination must be performed upon an exponentially changing voltage after several time constants have elapsed. This may lead to undesirable jitter in the delay because noise will tend to vary discrimination points.

It is the object of this invention to provide a delay circuit which does not need a capacitor to establish its delay time.

It is another object of this invention to provide a delay circuit which is less subject to jitter than the conventionally used delay circuits.

The invention applies the collector following phenomenon and the minority carrier storage phenomenon of semiconductors which occur under certain conditions that will be discussed, to achieve a delay without using capacitors to establish delay time, and will be less subject to jitter.

The above said phenomena are also discussed in my copending application titled Minority Carrier Storage Flip-Flop, Ser. No. 351,999, filed Mar. 16, 1964. In the above copending application the aforementioned phenomena are applied to the provision of a flip-flop circuit.

According to an embodiment of the present invention, a delay circuit is disclosed comprising a transistor with an input electrode, an output electrode and a common electrode, and a network is connected to the input electrode for applying a first voltage to cause a large number of minority carriers to be injected in said transistor for storage and subsequently a second voltage to cutoff the transistor. A resistive means is connected to the output electrode to prevent the immediate discharge of the injected carriers during cutoff. The resistance and said network being dimensioned so as to drive the voltage of the output electrode to a level near said second voltage and remaining at that level for a delay interval.

The details of the invention will be explained in the description which follows. Reference is made to the drawings in which.

Figure 4:
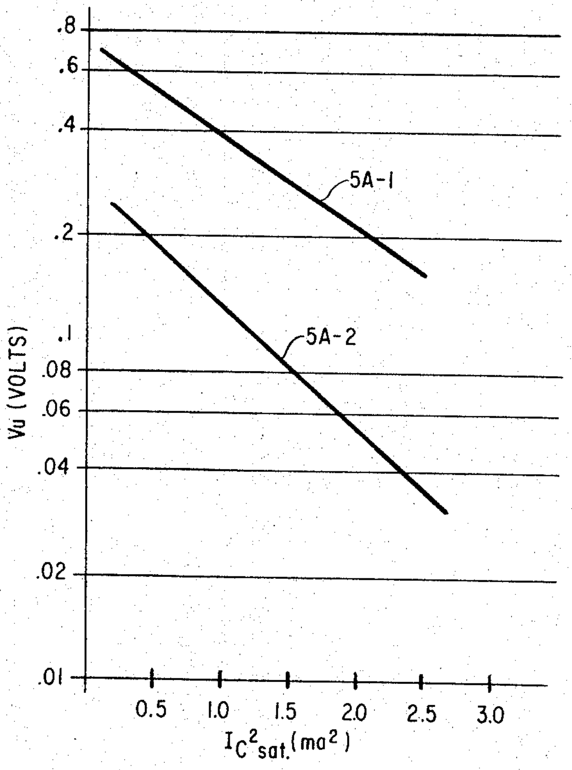

FIG. 4 also illustrates a plot of the undershoot voltage, $V_u$, versus the square of the saturation current, $I_c^2$, for two particular transistor types used for the output transistor.

Figure 5:
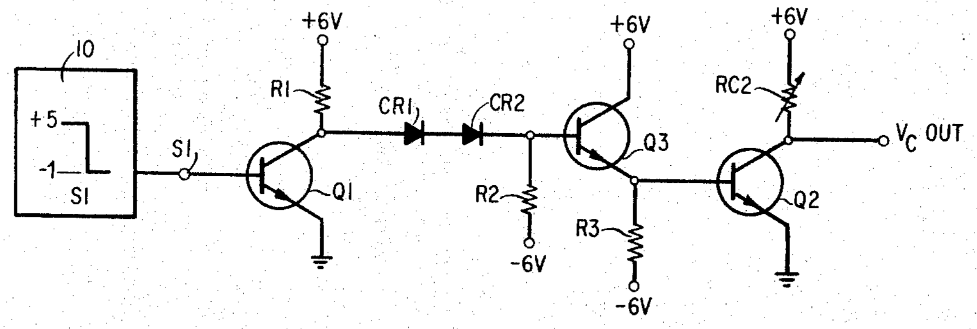
Figure 6A:
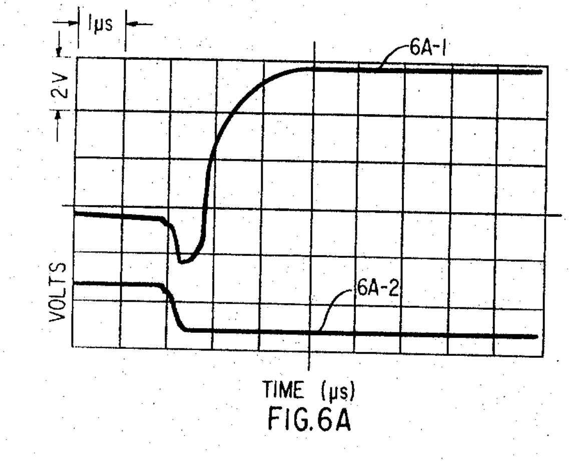
Figure 6B:
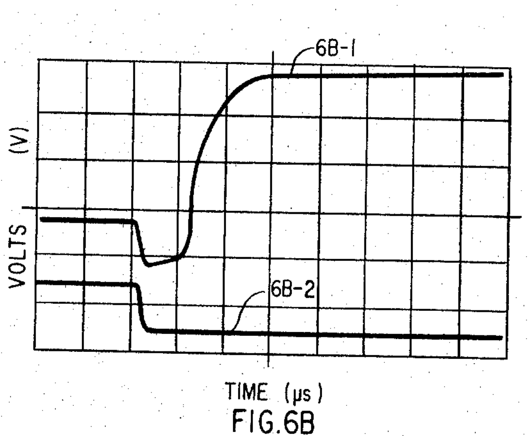
Figure 6C:
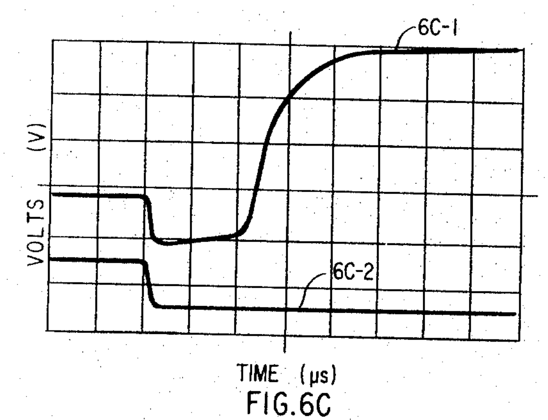
Figure 6D:
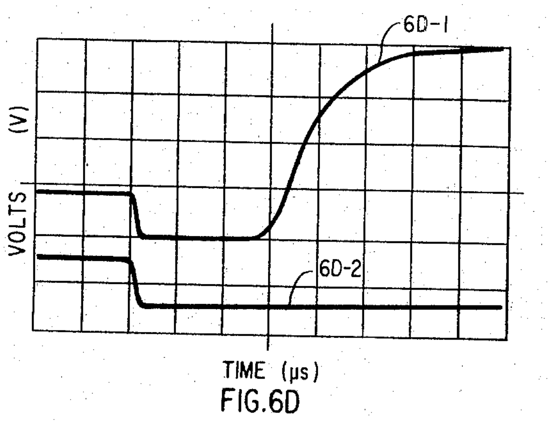
Figure 6E:
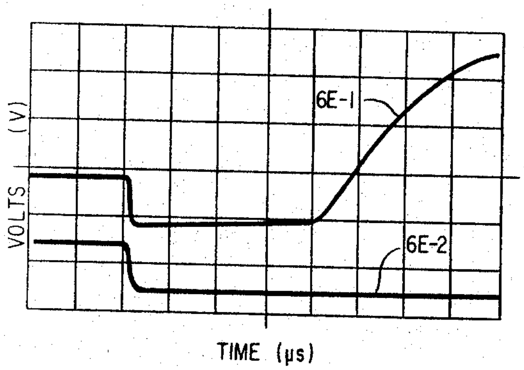
Figure 6F:
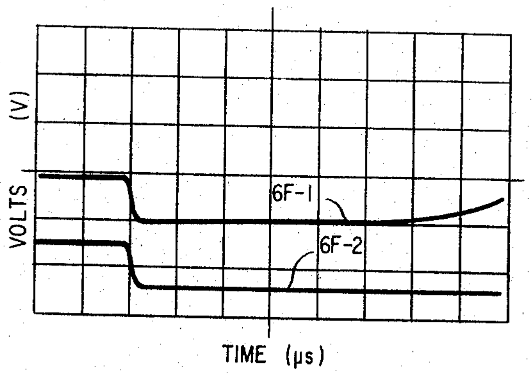

FIG. 5 is a delay circuit in which the collector voltage of the output transistor follows the base voltage after such transistor is cutoff from a state of saturation. The output transistor is being driven by an emitter follower.

FIGS. 6A through 6F show the behavior of the collector voltage of the output transistor of FIG. 5 after such transistor has been cutoff from a state of saturation, for various values of collector resistance.

Figure 7:
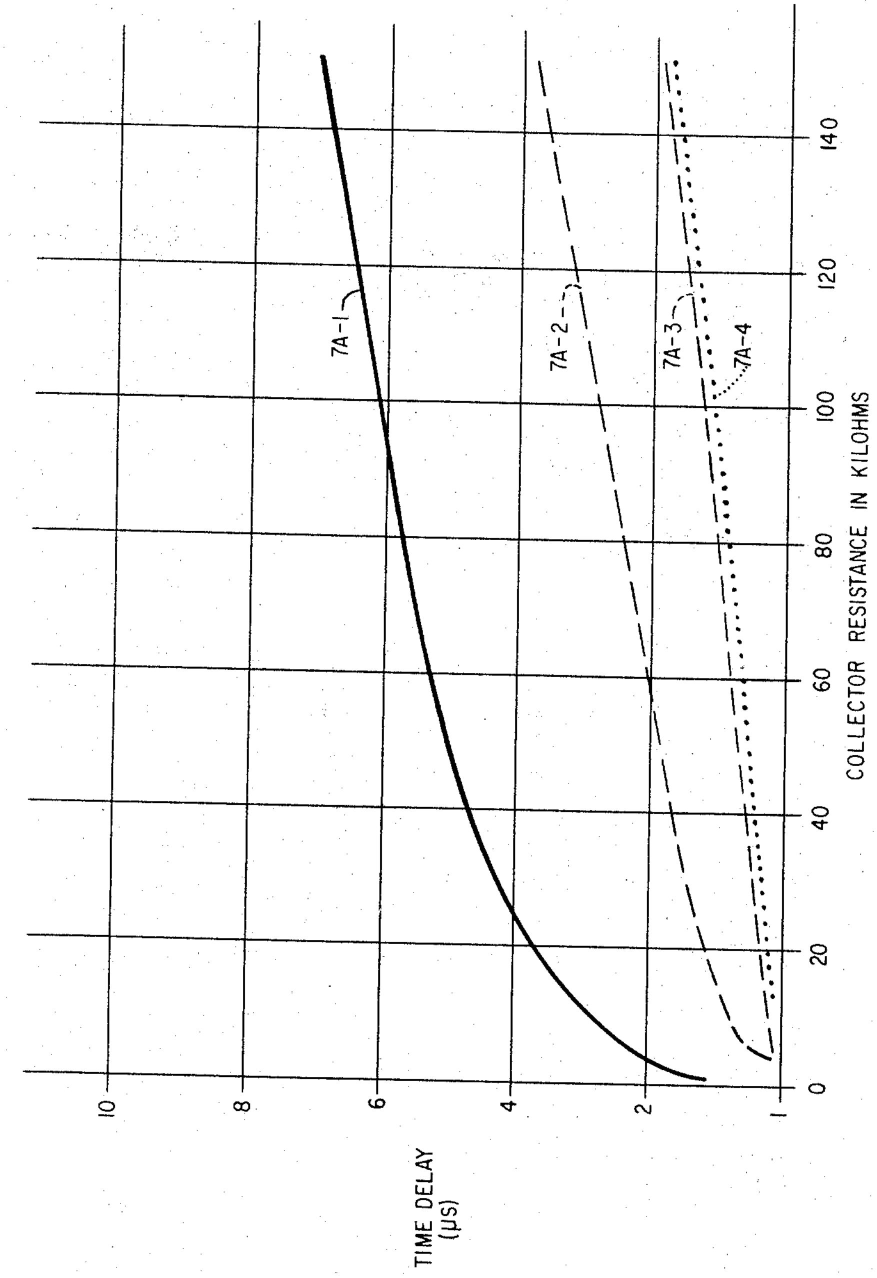

FIG. 7 illustrates the plot of time delay versus collector resistance of the output transistor of FIG. 5 for particular transistors.

Figure 8:
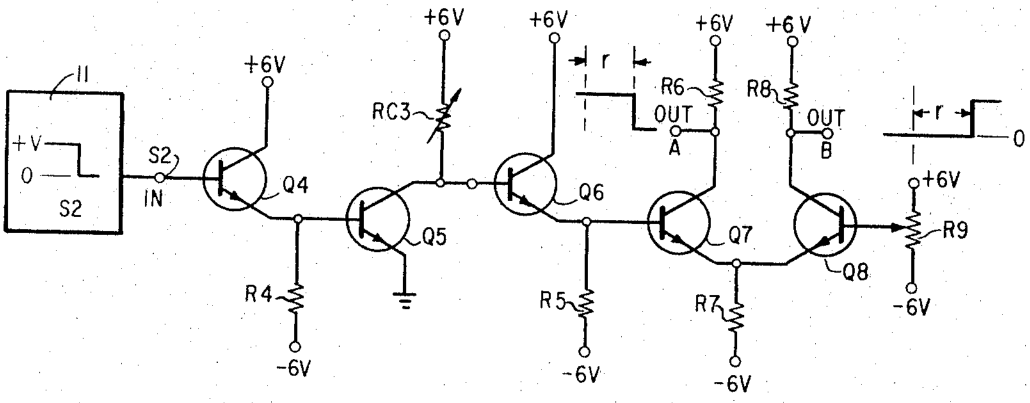

FIG. 8 is a schematic of an asymmetrical variable recallable delay circuit.

Figure 9A:
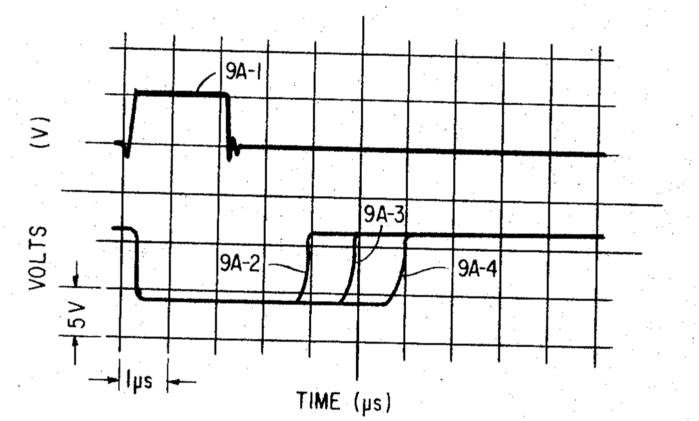
Figure 9B:
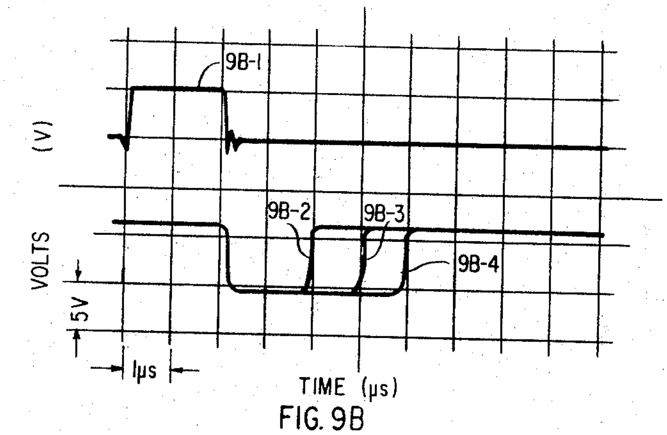

FIGS. 9A and 9B show the output at point B of the delay circuit of FIG. 8; FIG. 9A is for a discrimination level above ground and FIG. 9B is for a discrimination level below ground.

Figure 1:
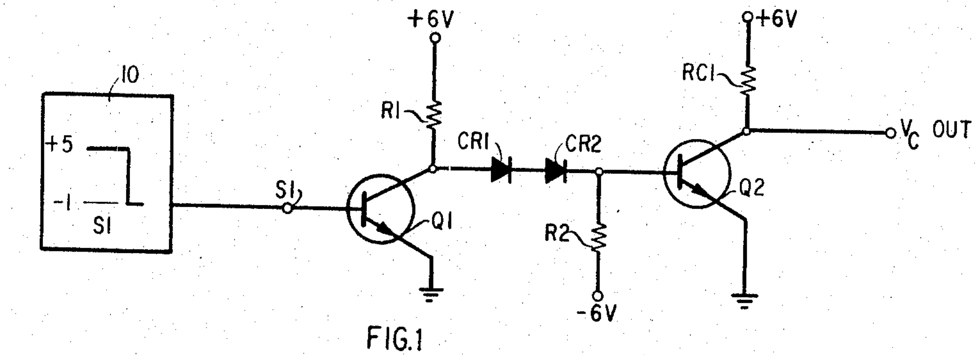
FIG. 1 is a delay circuit in which the collector voltage of the output transistor follows the base voltage after such transistor is cutoff from a state of saturation.

FIG. 1 illustrates a delay circuit in which, due to the collector following effect, the collector voltage of Q2, after such transistor has been cut off from a state of saturation, follows the base cutoff voltage to a level below or near such cutoff voltage and remains there for a delay period before rising toward the value of the collector source voltage. The delay period, $\tau$, is approximately the length of time for the collector voltage of Q2 to approach the value of the collector supply voltage after being cutoff from saturation. During saturation, the minority carriers are injected in the transistor and if the transistor is rather sharply cut off the minority carriers are stored causing, fo properly dimensioned circuit parameters, the collector voltage of Q2 initially to drop instead of immediately starting toward the value of the supply voltage.

When signal S1 from signal generator 10 is at −1 V., transistor Q1 becomes cutoff and Q2 in turn is saturated. As signal S1 goes to +5 V., Q1 becomes saturated which results in Q2 being cutoff. Under the foregoing conditions, when a common emitter trasistor with a somewhat large collector resistor is brought from a state of saturation to cutoff, the collector will be observed to "follow" the base.

Figure 2:
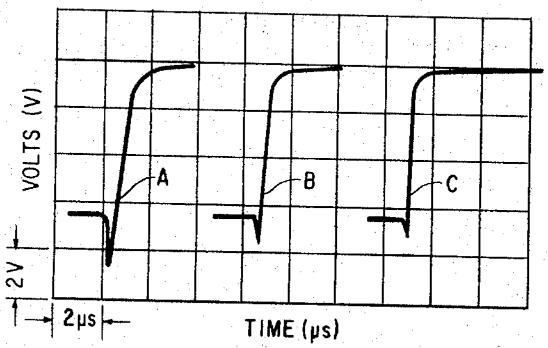
FIG. 2 shows the collector voltage response for the output transistor of the circuit of FIG. 1 for various values of collector resistance.

For the driving circuit of FIG. 1, the undershoot voltage $V_u$ behaves as shown in FIG. 2 A, B and C for various values of the collector resistance, RC1; A indicates the response for 2.2K, B for 1K, and C for 560 ohms. It will be noted that the value of $V_u$ increases with increasing RC.

In order to ascertain the relationship of the undershoot voltage $V_u$ to the injection and storage of minority carriers, data was taken for $V_u$ for various values of collector current at saturation; saturated collector current being considered a yardstick for the degree of injection and storage of minority carriers.

Figure 3:
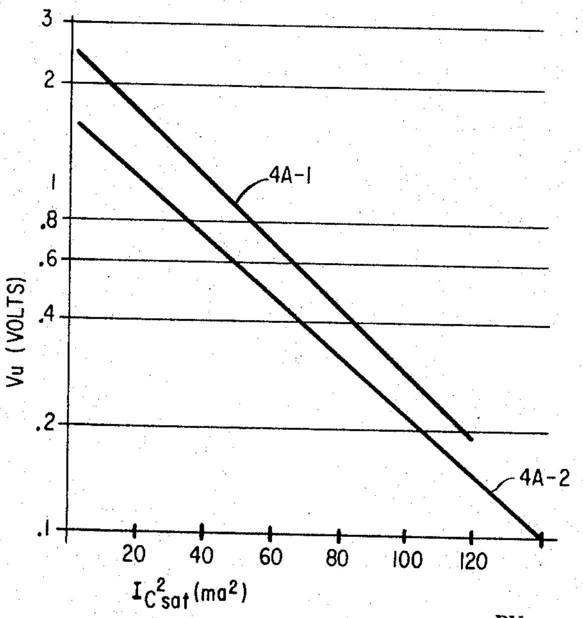
FIG. 3 illustrates plots of the undershoot collector voltage, $V_u$, versus the square of saturation current in the collector, $I_c^2$, of a particular transistor type used for the output transistor in FIG. 1.

Noting that a plot of $\log_{10}V_u$ versus $I_c$ sat. resembles a parabola, plots were made of $\log_{10}V_u$ versus $I_c^2$ sat., yielding reasonably linear curves. A plot of $V_u$ versus $I_c^2$ sat. is shown in FIG. 3 for two 2N1613 transistors, and in FIG. 4 for a 2N706 and a 2N2476 transistor. The curves indicate that decreasing of the collector saturation current correspondingly increases the undershoot voltage. Thus, $V_u$ is approximately a Gaussian function of normalized I sat., i.e., $$V_u \approx Ke^{-kI^2} k>0$$

The circuit of FIG. 5 adds a high impedance driving network to the circuit of FIG. 1. The driving network includes the emitter follower Q3 interposed between transistor Q1 and Q2. The collector of Q2, after being cutoff from a state of saturation, will follow the base to a value $V_u$, remain essentially constant at such value for a period of time before rising approximately exponentially to approximately the collector supply voltage. As in FIG. 1, the day period, $\tau$, of FIG. 5, is the length of time that it takes for the collector voltage of Q2 to approach the collector supply voltage after being cutoff from a state of saturation. The emitter follower having a high input impedance enables a substantially positive voltage to be applied to its base and to thereby pull the emitter current up to a value which would correspondingly cause a high minority carrier injection into Q2. The minority carrier injection and storage in the circuit of FIG. 5 is substantially larger than in the circuit of FIG. 1. FIG. 1, by decreasing R1, could also increase the minority carrier injection into Q2, but this approach may not be the most desirable due to the increased current which would be flowing in Q1 at saturation.

The delay time $\tau$, for the circuit of FIG. 5 can be raised to a surprisingly high value, as is shown in FIG. 6 for the various values of collector resistance. Curves 6A–2, 6B–2, 6C–2, 6D–2, 6E–2 and 6F–2 represent the input signal to transistor Q1. Waveforms 6A–1, 6B–1, 6C–1, 6D–1, 6E–1 and 6F–1 correspond to the response of the collector of Q3 for collector resistances of 560 ohms, 1.2K, 3.9K, 10K, 27K and 150K respectively, after the transistor had been cutoff from a state of saturation. The greater the resistance, the greater the delay time. A plot of time delay in $\mu$sec. versus collector resistance in kilohms of transistor Q2 is shown in FIG. 7. Curve 7A–1 is for a transistor 2N1613, 7A–2 is for transistor 2N2476, 7A–3 is for transistor 2N706, 7A–4 is for transistor 2N1302. As the foregoing curves indicate, there is a point for the transistors such that a significant increase of resistance will not bring a corresponding significant increase in delay time.

The circuits of FIG. 1 and FIG. 5 indicate that both driving input impedance and collector resistance of transistor Q2 affect the length of the delay period. The data illustrates that the delay is sensitive to driving circuit impedance as well as collector resistance.

A versatile, asymmetrical, variable recallable delay circuit is illustrated in FIG. 8. The delay circuit is comprised of an emitter follower Q4, a minority carrier storage circuit including Q5, a second emitter follower Q6, serving as a high impedance buffer, and a switching circuit including Q6 and Q7 and a discrimination level adjuster R9.

Considering the circuit of FIG. 8 for a discrimination level set slightly above ground by variable resistor R9, the following occurs: Signal S2 from signal generator 11 going from zero volts to +6 volts drives emitter follower Q4 positive which saturates Q5 and drops the potential at the collector of Q5 to a point near ground. The emitter follower Q6 drops the base voltage of Q7 to a value below the discrimination level causing transistors Q7 and Q8 to change state; Q7 is cutoff and Q8 saturates. When S2 drops from +6 volts to 0 volts, the emitter voltage of Q4 turns Q5 off and the collector follows the base due to the collector following principle, thereby preventing, for a period of time, $\tau$, the emitter of Q6 from rising above the discrimination level. The length of time that Q7 and Q8 remain unchanged depends upon the values of RC3. FIG. 9A shows the wave forms at the output of Q8 for RC3 values of 1.8K, curve 9A–2; 4.7K, curve 9A–3; and 10K, curve 9A–4, and for a discrimination level slightly above ground.

When the discrimination level is set by resistor R9 to a value slightly below ground, the circuit behaves somewhat differently. Signal S2 going from 0 volt to +6 volts drives emitter follower Q4 positive which saturates Q5 and drops the potential at the collector of Q5 to a point near ground. The emitter follower Q6 drops the base voltage of Q7 but not below the discriminator preset level and the outputs of Q7 and Q8 remain unchanged. When S2 drops from +6 volts to 0 volt, the emitter voltage of Q4 turns Q5 off and the collector follows the base due to the collector following effect, for a period of time $\tau$, to a more negative value below ground. Emitter follower Q6 now presents for a time $\tau$ a voltage below the discrimination level to cause Q7 and Q8 to change state; Q7 is cutoff and Q8 saturates. FIG. 9B illustrates the output of Q8 for RC3 values of 2.7K, curve 9B–2; 6.8K, curve 9B–3; and 15K, curve 9B–4. Curve 9A–1 and 9B–1 of FIG. 9A and FIG. 9B represent the input signal from source 11.

The delay is asymmetric in that a positive going input produces an essentially immediate output, while a negative going input produces a delayed output. It should be noted that the delay can be reduced to a value almost arbitrarily close to zero. A symmetrical variable delay can be produced using two of the above type delay circuits, two NOR, NAND, or inverter circuits, and two ganged potentiometers.

The application of the collector following phenomenon of junction type semiconductors depends upon an adequate supply of minority carriers being injected into the transistor when saturated, and stored during cutoff. When saturation occurs, the base current is approximately equal to the emitter current and the collector current is small by comparison. Transistor saturation is a condition in which both the emitter and collector junctions are forward biased. Considering an NPN saturated transistor, the emitter current being heavy, a high level injection of electrons takes place at the emitter-base junction. Since the base region is made physically narrower than the emitter or collector, the electrons flowing through the emitter base barrier will experience a low mortality rate, in that, very few of the total electrons will merge with the holes of the P type base material to form an electron-pair bond. The electrons not combining with the holes of the base will diffuse into the collector. The excess flow of electrons to the collector has a forward biasing effect on the collector-base junction causing a low net rate of flow of charge which at equilibrium equals the collector current, and is much less than the emitter current.

When the base potential of a saturated junction transistor is rapidly reduced to a level below that of the emitter, the emitter base junction becomes reversed biased while the collector base junction remains forward biased. The collector, of the collector resistance connected between the collector and a positive voltage source is somewhat large, will follow the base voltage instead of immediately rising toward the positive external voltage or remain for a time unchanged, because the current necessary to change the collector-base junction potential appreciably is not available. The length of time that the collector potential remains essentially constant is called the delay time or storage time. Delay time results from a large number of minority carriers being stored in the base and collector region of the transistor at the moment when the input current is cutoff. If an NPN transistor is saturated and suddenly cutoff, the electrons would be the excess minority carriers in the base and holes the excess minority carriers in the collector. The carriers affecting storage time required a definite time to be collected which is a function of the degree of saturation. Therefore, the delay could be avoided by biasing the transistor so that it goes from cutoff into an active state rather than saturation. However, in the delay arrangement of FIGS. 1, 5, and 8, the storage effect of carriers is utilized to bring about the desired result.

When the transistor is cutoff after being saturated, the excess charge in the base and collector is removed by recombination and collector-base current. Thus, the minority carrier storage effect consists of storing charge with a low impedance source, and removing it with a high impedance sink and recombination.

An approximate expression for the charge remaining during the period of collector-base forward bias is:

$$Q=Q_0e^{-t/\tau'-\int_0^{t} i_c\,dt}$$

where:

$Q_0$ is the total excess charge stored
$\tau'$ is the effective lifetime of minority carriers
$i_c$ is the collector current.

Since $i_c$ is, to a good approximation, constant during the period of forward bias, $$Q=Q_0e^{-t/\tau'}-It$$

Of interest is the time $\tau$ necessary to reduce this charge to 0 (zero), satisfying $$0=Q_0e^{-\tau/\tau'}-I\tau$$

Noting that the current I is given by $$I=\frac{E+V_u}{R}=\frac{V_0}{R}$$

where:

$E$=collector supply voltage
$V_u$=undershoot voltage, the following expression may be written relating delay time to collector resistance:

$$R=\frac{V_0}{Q_0}\tau e^{\tau/\tau'}$$

Where $V_0$ is equal to the sum of the collector supply voltage and the undershoot voltage $V_u$ (maximum negative voltage at cutoff for an NPN transistor).

Recognizing that the slope of an exponential is proportional to its initial value, and that recombination will take place throughout the semiconductor, and superposition should not be applied in combining non-linear effects, the following approximations are made to warrant the expression used above for charge remaining during collector forward bias.

(1) Recombination and charge recovery are independent processes.

(2) The ratio of the charge annihilated during recovery to that annihilated during decay is large.

(3) The various decay processes may be lumped into an effective minority-carrier lifetime.

These approximations can be justified on the basis of the following:

(1) It will be seen that this approximation is good for all $\tau$ whenever one effect is much greater than the other; thus, in particular, the expression is correct for either (or trivially, both) effect absent.

In addition, the approximation is good for small $\tau/\tau'$ even if the effects are of comparable magnitude.

(2) This approximation is reasonable under most conditions, but becomes especially good for low $\tau'$ and/or high extraction current.

(3) This approximation is usual.

Also the charge expression can be shown to be an approximation of that derived by Yohan Cho for a long-base diode in a paper titled, "A Method of Theoretical Analysis of High Speed Junction Diode Logic Circuits," appearing in the October 1963 "IEEE Transactions on Electronic Computers."

As the above equation indicates, a relationship exists between the collector resistance R, and the time $\tau$, necessary to reduce the charge stored in the transistor during saturation to zero. The equation was verified by plotting a curve $\tau$ versus R with values of $\tau$ measured with a scope of the collector voltage waveform during cutoff immediately following saturation; then taking two points from the curve and using the R and $\tau$ values therefrom to provide two equations for $$R=\frac{V_0}{Q_0}\tau e^{\tau/\tau'}$$

in order to solve for the constants $V_0/Q_0$ and $\tau'$; then calculating $\tau$ for given values of R to compare calculated $\tau$ with the measured $\tau$ of the $\tau$ versus R curve. It was found using transistors 2N1613, 2N1302, 2N706 and 2N2476 that the measured $\tau$ and calculated $\tau$ for each was substantially equivalent. Below are listed the values of constants $V_0/Q_0$ and $\tau'$

| | $V_0/Q_0$ (Ω/sec.) | $\tau'$ (μsec.) |
|---|---|---|
| 2N1613 | 1.51 | 2.63 |
| 2N1302 | 15.92 | 4.2 |
| 2N706 and 2N2476 | 78.0 | 27.3 |

Since $V_0$ is constant for all cases, it can be seen that the list is in order of decreasing $Q_0$, but increasing $\tau'$; in view of the increasing order of speed, the former result was expected and the latter unexpected.

In the table below the R and $\tau$ relationship is indicated. Both $\tau$ measured and $\tau$ calculated are shown.

| R | 2N1613 | | 2N1302 | | 2N706 and 2N2476 | |
|---|---|---|---|---|---|---|
| | $\tau$ meas., μs. | $\tau$ cal., μs. | $\tau$ meas., μs. | $\tau$ cal., μs. | $\tau$ meas., μs. | $\tau$ cal., μs. |
| 47K | 4.9 | 4.9 | 1.8 | 1.9 | .6 | .6 |
| 82K | 5.7 | 5.8 | 2.5 | 2.7 | 1.0 | 1.1 |
| 120K | 6.5 | 6.5 | 3.2 | 3.4 | 1.5 | 1.6 |

The base and collector regions will have minority-carrier lifetimes which will differ because of differences in impurity concentrations and carrier type. Since the resistivity of the collector region is considerably greater than that of the base, the lifetime of minority carriers will, in general, be greater in the collector than in the base. Based upon this, the following theory will be advanced: in a 2N1613, the majority of excess charge storage is in the base region, while in the 2N706 and 2N2476, it is in the collector. It should be noted that each of the above types used was a planar, double-diffused epitaxial silicon transistor. The 2N1302 was an alloy-junction germanium transistor.

Applying the above to the circuit of FIG. 1, a common emitter transistor with a somewhat large collector resistor will follow the base voltage when it is brought from a state of saturation to a cutoff condition for a period of time until it reduces the charge stored during saturation. This delay due to the storage is recallable in the sense that no output change will occur following an input voltage drop (NPN transistor) if an input rise intervenes before the delay time has elapsed.

Delays from 1 to 10 μs. with a 2N1613 and .03 to 1.1 μs. with a 2N706, and intermediate ranges with other transistors are easily obtainable.

The upper limit on delay is set by the leakage current, which for high collector R, becomes an appreciable part of the collector current.

The delay produced by this method is more precise and less subject to jitter than that produced by an RC circuit because the rate of change at the discrimination level for the former will always be greater.

With reference to FIG. 1, signal generator 10 applies a step voltage to the base Q1. The emitter of Q1 is grounded. Diode CR1 and resistor R1 are connected to the collector of Q1; the other side of R1 is connected to the +6 volt supply. Diode CR2 and resistor R2 are connected to the base of transistor Q2; the other end of CR2 is tied to CR1 and the other end of R2 is connected to a −6 volt supply. The emitter of Q2 is grounded. One sides of resistor RC1 and the output terminal are connected to the collector of Q2; the other side of RC1 being connected to a +6 volt supply. Some typical values for the foregoing circuit are given: R1 is 1.5K, R2 is 5.6K, Q1 is a 2N706. Types of transistors used for Q2 and the effect of different values of RC1 were discussed above.

In FIG. 5, the input signal S1 generated by signal generator 10 is connected to the base of transistor Q1. The emitter of Q1 is grounded. Diode CR1 and resistor R1 are connected to the collector of Q1; the other side of R1 is connectel to the +6 volt supply. Diode CR2 and resistor R2 are connected to the base of transistor Q3; the other side of CR2 is tied to CR1 and the other end of R2 is connected to a −6 volt supply. The collector Q3 is tied directly to the +6 volt supply and the emitter has a connection to resistor R3 and the base of Q2; the other side of R3 going to a −6 volt supply. The emitter of Q2 is grounded and the collector is connected to the output terminal $V_c$ and variable resistance RC2; the other side of RC2 going to a +6 volt supply. Some typical values for the FIG. 5 circuit are given: R1 is 1.5K, R2 is 5.6K, R3 is 120, A1 is 2N706, Q3 is a 2N2476 and the types of transistors used for Q2 and the effect of different values of RC2 were discussed above.

Some typical values of the circuit in FIG. 8 are given: R4 is 120 ohms, R5 is 10K, R6 is 1.5K, R7 is 1K, R8 is 1.5K, R9 is a variable resistance of a 10K magnitude, Q4 is a 2N2476, Q5 is a 2N613, Q6 is a 2N706, Q7 is a 2N706, Q8 is a 2N706.

While the present invention has been described with respect to particular embodiments, these descriptions are intended in no way to limit the scope of the invention.

What is claimed is:

1. In a delay arrangement including a transistor utilizing minority carrier storage, said transistor having a base, emitter, and collector electrode, an output connected to said collector electrode, a driving means connected to said base electrode, and providing a first voltage for saturating said transistor, whereby a large number of minority carriers are injected into the junction between said base and emitter electrodes, and a second voltage for cutting off said transistor, a source of bias voltage connected to said collector electrode, and resistive means connected between said output and said bias voltage source to prevent the immediate discharge of said injected carriers during the cutting off of said transistor so that the voltage at said output approaches the voltage of said bias source; the improvement comprising:

a discriminator including an input coupled to the output of said transistor and including an output providing a first and second voltage state; and a switching level adjuster connected to said discriminator for controlling the time interval during which said output provides said second voltage state, said adjuster having a first and second setting so that when said adjuster is positioned to said first setting, the output of said discriminator switches from said first state to said second state already upon the saturation of said transistor, remaining in said second state until the output of said transistor nears the voltage of said bias source, while when said adjuster is positioned to said second setting, the output of said discriminator initially remains in said first state upon the saturation of said transistor, and switches from said first state to said second state only after said transistor has been cut off, the last-mentioned output then remaining in said second state until the output voltage of said transistor nears the voltage of said bias source.

2. The combination in a delay arrangement as claimed in claim 1 wherein said discriminator includes a first switching means and a second switching means each having an input and an output, one of said two outputs forming said discriminator output, said first and second switching means being interconnected so that a change of state in one will cause an opposite change of state in the other; wherein an emitter follower stage is interposed between the output of said transistor and the input of said first switching means, and wherein said switching level adjuster comprises a voltage divider having its intermediate terminal connected to the input of said second switching means.

References Cited by the Examiner

UNITED STATES PATENTS

| | | | |
|---|---|---|---|
| 3,018,389 | 1/1962 | Herscher ---------- | 307—88.5 |
| 3,050,640 | 8/1962 | Dillingham et al. ---- | 307—88.5 |
| 3,091,705 | 5/1963 | Levine ------------ | 307—88.5 |
| 3,230,393 | 1/1966 | Amodei ----------- | 307—88.5 |
| 3,248,564 | 4/1966 | Rees -------------- | 307—88.5 |

ARTHUR GAUSS, *Primary Examiner.*

J. JORDAN, *Assistant Examiner.*